UNITED STATES PATENT OFFICE.

ALFRED EWART HOLLEY AND HARRY WILLIAM WEBB, OF OLDBURY, ENGLAND, ASSIGNORS TO CHANCE AND HUNT, LIMITED, OF OLDBURY, ENGLAND.

ACID-RESISTING CEMENT.

1,287,995.   Specification of Letters Patent.   Patented Dec. 17, 1918.

No Drawing.   Application filed September 4, 1917.   Serial No. 189,668.

*To all whom it may concern:*

Be it known that we, ALFRED EWART HOLLEY and HARRY WILLIAM WEBB, subjects of the King of Great Britain, residing at Chemical Works, Oldbury, England, have invented a new and useful Improved Acid-Resisting Cement, of which the following is a specification.

This invention relates to an improved acid resisting cement, and has for its object a cement which, while resisting acid, sets sufficiently quickly to be employed for ordinary building purposes.

Ordinary acid resisting cements usually consist of mixtures of an aqueous solution of sodium silicate with acid resisting silicious material.

Cements of this type cannot be employed for ordinary building purposes as they set slowly and are not until partially set strong enough to support the weight of bricks; they are moreover too sticky to work with a trowel.

According to this invention there is added to such known cements 0.5 to 5.0% of calcium sulfate, (by which term it is intended to include plaster of Paris, or a mixture of materials forming calcium sulfate.)

The aqueous sodium silicate solution employed is preferably about 55° to 65° Tw.

A good example of the improved cement is set out below:—

| | |
|---|---|
| Ground stoneware passing through a 30 mesh sieve | 8 parts by weight |
| Fine Leighton sand | 7 parts by weight |
| Ground blue brick passing through a 60 mesh sieve | 2 parts by weight |
| 60° Tw. sodium silicate solution | 3 parts by weight |
| Plaster of Paris | 0.12 parts by weight |

The solids are intimately mixed together, a solution of sodium silicate being then mixed with them, either by hand, as with ordinary mortar, but preferably for five to ten minutes in an edge runner mill.

The cement should be used within an hour of making up, and no water or steam should be allowed to come into contact with either the solid constituents forming the cement, or with the cement itself, until it is thoroughly dry, and it is therefore desirable to subject the finished work for several days to a temperature of 100° C. or for a shorter time to a higher temperature.

Cements made in accordance with this invention are unaffected by mineral acids or mixtures thereof over a wide range of temperature, and by sulfur di-oxid or tri-oxid, nitrous gases, chlorin or sulfureted hydrogen; they are therefore particularly suitable for the erection of chimneys to take acid fumes, for reaction and absorbing towers, for acid storage tanks, and in fact for all cases where a good acid resisting cement is required and can be applied under suitable conditions.

What we claim is:—

1. An acid resisting cement formed by mixing together acid resisting silicious material and a solution of a silicate, the latter being present in amount sufficient to give the cement after hardening acid-proof properties, together with not over 5% of calcium sulfate, such material being free from free mineral acid.

2. An acid resisting cement formed by mixing together acid resisting silicious material, and over 14% of a solution of an alkali metal silicate of 55° to 65° Tw. and an amount of plaster of Paris insufficient to produce any considerable hardness by setting, such mixture containing no free mineral acid.

3. An acid resisting cement comprising about 17 parts by weight of an acid resisting silicious material, about 0.12 parts by weight of calcium sulfate, and about 3 parts by weight of a 60° Tw. solution of sodium silicate.

4. An acid resisting acid free cement comprising a mixture of a silicious material unattackable by acid and sodium silicate, and as an addition capable of hastening the setting thereof, not over 5% of calcium sulfate.

In testimony that we claim the foregoing as our invention, we have signed our names this 2nd day of August 1917.

ALFRED EWART HOLLEY.
HARRY WILLIAM WEBB.

Copies of this patent may be obtained for five cents each, by addressing the "Commissioner of Patents, Washington, D. C."